United States Patent [19]

Minnis et al.

[11] 4,400,441

[45] * Aug. 23, 1983

[54] ELECTROGRAPHIC COATING CONTAINING AQUEOUS EMULSION COPOLYMERIZED ACRYLAMIDE COPOLYMERS

[75] Inventors: Ralph L. Minnis, Des Plaines; Frank J. Ragas, Willow Springs; Gerson E. Beauchamp, Park Ridge, all of Ill.

[73] Assignee: DeSoto, Inc., Des Plaines, Ill.

[ * ] Notice: The portion of the term of this patent subsequent to Jul. 13, 1999 has been disclaimed.

[21] Appl. No.: 285,967

[22] Filed: Jul. 23, 1981

Related U.S. Application Data

[63] Continuation-in-part of Ser. No. 124,111, Feb. 25, 1980, Pat. No. 4,339,505.

[51] Int. Cl.[3] .......... B32B 27/08

[52] U.S. Cl. .......... 428/514; 162/135; 162/136; 427/121; 427/391; 428/537; 428/511; 524/425; 524/555

[58] Field of Search .......... 428/537, 571, 513, 514; 162/135, 136, 138, 168 MA; 427/121, 391; 524/555, 425; 526/304, 307.5, 307.6, 307.7

[56] References Cited

U.S. PATENT DOCUMENTS

| | | | |
|---|---|---|---|
| 4,098,987 | 7/1978 | Barua et al. | 526/304 |
| 4,321,176 | 3/1982 | Sekmakas et al. | 524/555 |

*Primary Examiner*—George F. Lesmes
*Assistant Examiner*—E. Rollins Buffalow
*Attorney, Agent, or Firm*—Dressler, Goldsmith, Shore, Sutker & Milnamow, Ltd.

[57] ABSTRACT

Electrically conductive paper is coated with an insulating coating which is an aqueous latex of an aqueous emulsion copolymer of monoethylenically unsaturated monomers comprising from 5% to 40% of copolymerized acrylamide or a monoethylenic derivative thereof, preferably isobutoxymethyl acrylamide. A proportion of monoethylenically unsaturated carboxylic acid is preferably included in the copolymer.

10 Claims, No Drawings

ELECTROGRAPHIC COATING CONTAINING AQUEOUS EMULSION COPOLYMERIZED ACRYLAMIDE COPOLYMERS

DESCRIPTION

This application is a continuation-in-part of our prior application Ser. No. 124,111 filed Feb. 25, 1980, now U.S. Pat. No. 4,339,505.

TECHNICAL FIELD

This invention relates to insulating coatings which are applied to conductive substrates from aqueous medium to accept and hold an electrostatic charge as part of an electrostatic (electrographic) reprographic system. The usual aqueous coatings, when used for this purpose, fail to provide a clean and dense electrographic print with low background.

BACKGROUND ART

The application of insulating coatings to conductive substrates to produce coated sheets useful in electrographic printing processes is well known. In the known process, a paper which has been impregnated to render it electrically conductive is coated on one surface with an insulating resin which contains a proportion of inexpensive pigment, such as calcium carbonate, to provide an attractive surface coating which will hold an electrostatic charge. The coated paper is then passed over a charging electrode which applies an electrostatic charge to the coated surface in a pattern, and the coating is expected to receive as high a charge as possible and to hold this charge so that toner will be picked up only in the charged pattern.

The existing electrographic coatings are inadequate because: 1-they do not accept and hold as high a level of charge as is desired; 2- they tend to pick up a background charge; and 3- they cannot usefully contain as high a proportion of pigment as is desired.

Some of these problems were overcome in our prior application referred to hereinbefore, but solution coatings were there employed. Solution coatings have the evident disadvantage of employing organic solvents which are costly and which introduce a fire hazard. Moreover, solution coatings tend to penetrate the paper, and this normally requires that the paper be precoated to minimize penetration. Aqueous emulsion coatings avoid the expense and hazard of organic solvents, and they do not penetrate the paper as much, so the prior pretreatment can be eliminated. Unfortunately, most aqueous emulsion coatings do not provide very effective electrographic coatings.

DISCLOSURE OF INVENTION

In accordance with this invention, the polymer used to provide the insulating coating is a copolymer produced by aqueous emulsion copolymerization of monoethylenically unsaturated monomers containing from 5% to 40%, based on the total weight of the copolymer, of acrylamide or a derivative of acrylamide. Isobutoxymethyl acrylamide is particularly preferred for use in this invention. The inclusion of the acrylamide component into the copolymer increases the capacity of an applied coating to accept and hold a charge, to minimize background charge, and to usefully accept the presence of a larger proportion of pigment, all as pointed out in our prior application. The use of an N-methylol alkyl ether, preferably a $C_2$–$C_8$ alkyl ether, and especially in conjunction with the use of at least 2% by weight of a monoethylenic acid, provides superior results herein.

The use of a large amount of pigment, especially calcium carbonate, is important because the cost of the coating decreases and the attractive appearance and hand of the coating increases as the pigment to binder ratio is raised. The preferred coatings in this invention can accept a larger amount of pigment. In It is preferred to employ from 7% to 30% of the acrylamide component together with a pigment to binder weight ratio of from about 2:1 to about 8:1.

It will be understood that all proportions and ratios herein are by weight, unless otherwise specified.

The polymer used to provide the insulating coating is an aqueous emulsion copolymer comprising copolymerized acrylamide or a monoethylenic derivative thereof. Copolymers formed by aqueous emulsion copolymerization are of high molecular weight and provide excellent physical properties even when no cure after application is obtained. It is particularly preferred to employ copolymers entirely constituted by copolymerized monoethylenically unsaturated monomers, though very small amounts of polyethylenic materials can be present without adverse result. N-methylol functional acrylamide or methacrylamide alkyl ethers provide a cure after application, thus further enhancing the physical properties of the coating. Also, the ether group reduces the water solubility of the monomer, and this modifies the copolymerization and the product produced thereby.

The preferred monomers which are copolymerized with the acrylamide component are styrene and $C_1$–$C_8$ alkanol esters of acrylic and methacrylic acid. Methyl methacrylate is particularly preferred to constitute at least about 30% of the copolymer. N-butyl and isobutyl acrylate and methacrylate are also useful and 2-ethylhexyl acrylate is preferred for providing internal plasticization. Vinyl toluene and vinyl acetate are also useful.

It is particularly preferred to employ from 3–20% of an hydroxy functional monoethylenic monomer, such as 2-hydroxyethyl acrylate or methacrylate, but this is not essential.

A feature of this invention is the presence in the copolymer of from 1% to 10% by weight, more preferably from 3% to 8%, of a monoethylenic carboxylic acid, such as acrylic or methacrylic acid. These large amounts of acid are unusual in an emulsion copolymer, but they provide increased viscosity in the aqueous emulsion systems which are produced, and this is advantageous in this invention.

The selection of pigment is conventional herein, calcium carbonate being particularly preferred as indicated previously. Pigmentation is also conventional and may be carried out by simply grinding the finely divided calcium carbonate pigment into the aqeuous emulsion of copolymer particles. Higher proportions of pigment can be used herein while retaining good electrographic properties than can be obtained with other emulsion copolymers.

Isobutoxymethyl acrylamide is preferred because it is economical and highly effective. While acrylamide is less costly, it is water soluble and the isobutoxymethyl acrylamide copolymerizes better in the aqueous emulsion medium. This ether also minimizes prereaction and it resists hydrolysis in the final aqueous emulsion. Other derivatives of acrylamide which retain the single ethylenic group and the amide structure are also useful herein. These are illustrated by methacrylamide, dimethyl aminopropyl methacrylamide, dimethyl acrylamide, isobutoxymethylacrylamide and isopropyl aminopropyl methacrylamide.

The invention is illustrated in the example of preferred operation which follows:

940 grams of deionized water are charged to a reactor and heated to 80° C. and 2 grams of a nonionic surfactant constituted by nonyl phenol polyethoxylated to contain 9–10 mols of ethylene oxide per mol of nonyl phenol (Triton N-101 of Rohm and Haas may be used) are then mixed in.

A monomer preemulsion is separately prepared by mixing 848 grams of deionized water with 100 grams of a partially anionic and partially nonionic surfactant which is disodium ethoxylated $C_{10}$–$C_{12}$ alcohol half ester of sulfosuccinic acid (Aerosol A-102 of American Cyanamid may be used), 800 grams of methyl methacrylate, 940 grams of butyl acrylate, 200 grams of isobutoxymethyl acrylamide, and 60 grams of glacial acrylic acid.

6 grams of ammonium persulfate is then added to the hot surfactant water solution in the reactor and then the preemulsion is added slowly to the reactor over a 2 hour period. After monomer addition is complete, 1 gram of ammonium persulfate in 24 grams of deionized water are added to insure completion of monomer conversion. At the end of the reaction, 134 grams of deionized water are added. The temperature throughout the run is maintained at about 85° C.

The final product is filtered and has a pH of 3.67, and a Brookfield viscosity of 32 centipoises measured with a No. 2 spindle at 20 revolutions per minute. The nonvolatile solids content is 49.6%.

This copolymer emulsion (latex) is pigmented with finely divided calcium carbonate (atomite from Thomson-Weinman Company may be used) at a pigment to binder weight ratio of 3:1 using ordinary agitation to disperse the pigment. The resulting dispersion is then diluted with deionized water to a total solids content of 50% and drawn down with a No. 5 wire wound rod upon electroconductive paper (Crown Zellerbach conductive paper formulated to receive aqueous coatings [6–8 pounds of coating (dry) are deposited per ream (3000 square feet)]. The coated paper was dried by blowing warm air upon it.

After preconditioning the coated electroconductive paper at 72° F. and 50% relative humidity, the coated paper was tested by printing it with a Versatec electrographic printer. The resulting prints compare favorably with the print quality now obtained in commerce using the solvent-based electrographic coatings of our patent application referred to hereinbefore.

What is claimed is:

1. Electrically conductive paper coated with an insulating coating comprising an aqueous emulsion copolymer of monoethylenically unsaturated monomers comprising from 5% to 40% of copolymerized acrylamide or a monoethylenic derivative thereof.

2. Conductive paper as recited in claim 1 in which said copolymer comprises from 5% to 40% of copolymerized isobutoxymethyl acrylamide.

3. Conductive paper as recited in claims 1 or 2 in which said copolymer includes from 1% to 10% of copolymerized monoethylenically unsaturated carboxylic acid.

4. Conductive paper as recited in claim 1 in which said insulating coating is pigmented.

5. Conductive paper as recited in claim 4 in which said pigment is calcium carbonate.

6. Conductive paper as recited in claims 4 or 5 in which said pigment is present in a pigment to binder weight ratio of from 2:1 to 6:1.

7. Conductive paper as recited in claim 6 in which said copolymer comprises from 7% to 30% of copolymerized isobutoxymethyl acrylamide.

8. Conductive paper as recited in claim 7 in which the copolymer contains at least about 30% of copolymerized methyl methacrylate.

9. Conductive paper as recited in claim 8 in which said copolymer also contains from 3% to 20% of copolymerized hydroxy functional monoethylenic monomer.

10. Conductive paper as recited in claim 9 in which said hydroxy functional monomer is 2-hydroxyethyl methacrylate.

* * * * *